United States Patent [19]

Wallenfang

[11] Patent Number: 4,699,520

[45] Date of Patent: Oct. 13, 1987

[54] TEMPERATURE MEASURING DEVICE FOR RECORDING LARGE CHANGES IN TEMPERATURE

[75] Inventor: Gerd Wallenfang, Cologne, Fed. Rep. of Germany

[73] Assignee: Kloeckner-Humboldt-Deutz AG, Cologne, Fed. Rep. of Germany

[21] Appl. No.: 854,161

[22] Filed: Apr. 21, 1986

[30] Foreign Application Priority Data

Apr. 25, 1985 [DE] Fed. Rep. of Germany ....... 3514862

[51] Int. Cl.$^4$ .......................... G01K 7/16; G01K 13/02
[52] U.S. Cl. ..................................... 374/183; 307/310; 374/144
[58] Field of Search ....................... 374/178, 144, 183; 307/310

[56] References Cited

U.S. PATENT DOCUMENTS

| | | | |
|---|---|---|---|
| 3,106,645 | 10/1963 | Kaufman | 374/178 X |
| 3,538,771 | 11/1970 | Akeley | 374/144 X |
| 3,587,318 | 6/1971 | Belugou et al. | 374/164 |
| 3,987,318 | 10/1976 | Meijer | 374/178 X |
| 4,297,851 | 11/1981 | Padlock et al. | 374/183 |

Primary Examiner—Daniel M. Yasich
Attorney, Agent, or Firm—Charles L. Schwab

[57] ABSTRACT

A temperature measuring device for recording large changes in temperature, especially for recording the temperatures in an internal combustion engine. An NTC resistor is connected with a constant source of voltage via a dropping resistor and the drop in voltage across the NTC resistor is a gauge for the temperature. Because of the characteristics of the NTC resistor, measurement of low temperatures is possible with a high ohmic dropping resistor but accurate measurement of high temperatures is not possible. The opposite is true when using a low ohmic dropping resistor. In one embodiment of the disclosed device, it is possible to switch at a predetermined frequency the resistance of the dropping resistor circuit between a high ohmic and a low ohmic value, whereby the correspondingly produced output signal indicates the recorded temperature over the whole temperature range with a satisfactory degree of accuracy. Alternatively, the recorded temperature output signal may be fed to a comparer computer together with a control frequency to produce an output voltage with a probe ratio which is synchronized with the average recorded temperature thereby obtaining a greater gradient at the high and low temperature portions of the voltage versus temperature curve and more accurate measurement of high and low temperatures.

19 Claims, 6 Drawing Figures

TEMPERATURE MEASURING DEVICE FOR RECORDING LARGE CHANGES IN TEMPERATURE

TECHNICAL FIELD

This invention relates to a temperature measuring device for recording large changes in temperature, especially temperatures in an internal combustion engine.

BACKGROUND OF THE INVENTION

A known method for recording temperatures is the insertion of temperature dependent resistors such as NTC resistors into, or adjacent to, the item whose temperature is being monitored. A resistor of this type is connected to a constant source of voltage by way of a dropping resistor whereby the voltage drop at the temperature dependent resistor is a gauge for the recorded temperature or, as the case may be, change in temperature.

Temperature dependent resistors change their value in orders of magnitude to the power of ten. Thus, within a temperature range of −60° to +200° C., an NTC resistor changes its value from 160 KOhm to 20 Ohm (8000:1).

In order to achieve a sufficient degree of exactness in measuring at high temperatures, a low ohmic dropping resistor must be used. As can be gathered from curve 1 in FIG. 1, the change in voltage with a low ohmic dropping resistor in the range from −60° C. to 0° C. is almost nill, while in the case of high temperatures, there are sufficient changes in voltage which make a corresponding determination of temperature possible.

If a high ohmic dropping resistor is inserted to record lower temperatures, this results in curve 2, shown in FIG. 1, which is relatively flat in the higher temperature range so that an exact determination of temperatures in this range is not possible.

In practical use, further difficulties may be encountered including disorders such as breaks in conduction or short-circuiting. In the case of a low ohmic dropping resistor, an interruption in conduction to the NTC resistor in the low temperature range cannot be recognized, while in the case of a high ohmic resistor, a short-circuit of the NTC resistor in the high temperature ranges cannot be recognized.

OBJECTS AND SUMMARY OF THE INVENTION

It is a primary object of this invention to provide a temperature measuring device for measuring large changes in temperature which has a sufficient output signal to permit a positive determination of a break or a short-circuit in the electrical circuit at both low and high temperatures.

Switching from a high ohmic dropping resistor to a low ohmic dropping resistor, which is achieved by means responding to a strictly specified frequency, produces an output signal from the temperature measuring device which at a temperature point on the low ohmic curve (curve 1 in FIG. 1), corresponding to a predetermined frequency jumps to the high ohmic curve (curve 2 in FIG. 1). Accordingly, the output signal of the temperature measuring device is available at high as well as low temperatures and changes recognizably in its amplitude even with minor changes in temperature. The output signal reproduces both curves appropriately processed. Absence of the output signal, which normally changes dramatically in amplitude in a temperature measuring application, can indicate a break or short-circuit in the electrical circuit or a breakdown of the temperature dependent resistor.

By switching between a high ohmic and a low ohmic dropping resistor in accordance with this invention, the power which flows through the temperature dependent resistor is, in its average value, less than in the case of continuous operation with the low ohmic dropping resistor. The heat buildup of the temperature dependent resistor in the temperature measuring device of this invention is, therefore, lower. The temperature dependent resistor in a temperature measuring device of this invention is not heated to a greater extent, when producing high output signals, than when using the prior art device with a low ohmic dropping resistor.

The temperature measuring device of this invention makes advantageous use of a dropping resistor circuit which consists of parallel branches which include, respectively, a high ohmic resistor and a low ohmic resistor. One branch includes the low ohmic resistor and a switch which can be switched on and off by a specified frequency so that the dropping resistor circuit is switched at a set frequency between a high ohmic value, which is determined by the high ohmic resistor in the other parallel branch and a low ohmic value, which is determined primarily by the branch having the low ohmic resistor. An advantage lies in the fact that the switch is a transistor, which is operated as a switch by a frequency having a probe ratio of 1:1.

In one embodiment of the invention (FIG. 2), the dropping voltage at the temperature dependent resistor is plotted via a low pass filter so that at the outlet of the low pass filter a processed output signal is available which indicates a sufficiently great change in voltage over the entire temperature range.

In another embodiment of the invention (FIG. 3), the voltage proportional to the voltage drop at the temperature dependent resistor and a control voltage of predetermined frequency and wave form are fed to a computer, whereby the output signal of the temperature measuring device and the frequency of the switch are synchronized. This increases the gradient of the output curve at its high and low temperature portions thereby increasing the accuracy of measuring and indicating temperature.

BRIEF DESCRIPTION OF THE DRAWINGS

Additional features of the invention will be found in the following description and in the drawings, in which.

DETAILED DESCRIPTION OF THE DRAWINGS

Figures 1, 1A:
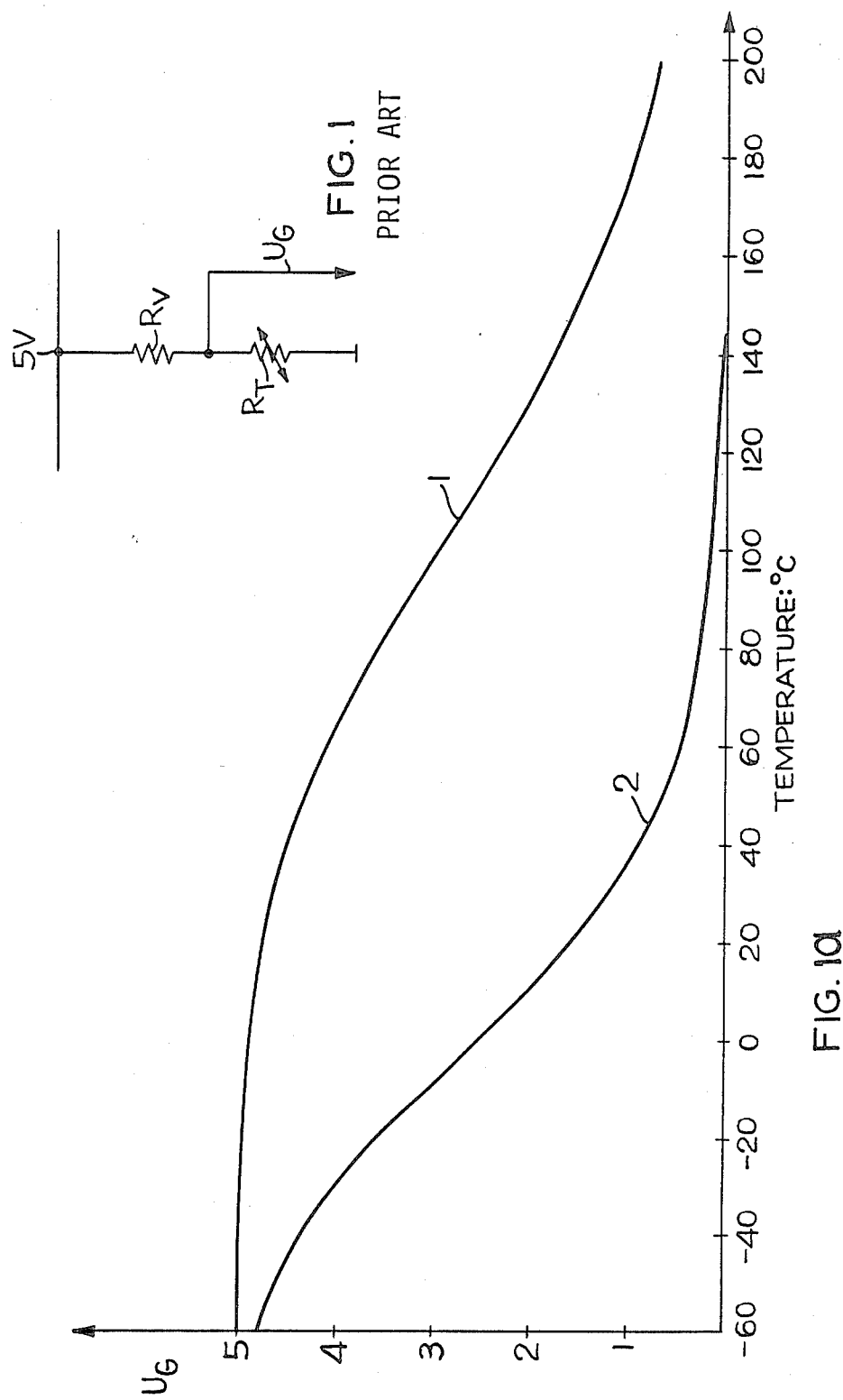
FIG. 1 shows a circuit for a temperature measuring device of the prior art.
FIG. 1a is a graph plotting the output signal versus the temperature using a prior art temperature measuring device with a high ohmic resistor and with a low ohmic resistor.

In the case of the known temperature measuring device illustrated in FIG. 1, the temperature dependent resistor $R_T$ is subjected, via a dropping resistor $R_V$, to a constant voltage source, of, for instance, 5 volts. The voltage drop $U_G$ at temperature dependent resistor $R_T$ is the output signal of the temperature measuring device. Using a low ohmic dropping resistor $R_V$ of, for instance, 120 Ohm, the output signal $U_G$ changes versus temperature as shown by curve 1. Using a high ohmic dropping resistor $R_V$ of, for instance, 4.7 KOhm, the output signal changes versus temperature as shown by curve 2. If a high ohmic dropping resistor is used, the change in the output signal in the area above 100° C., plus or minus 20° C., is relatively weak, so that an error-free, exact recording of temperature is not possible. In the case of a low ohmic dropping resistor, an exact determination of temperature in the range from $-60°$ C. to $+20°$ C. is not possible for the same reason.

Figure 2:
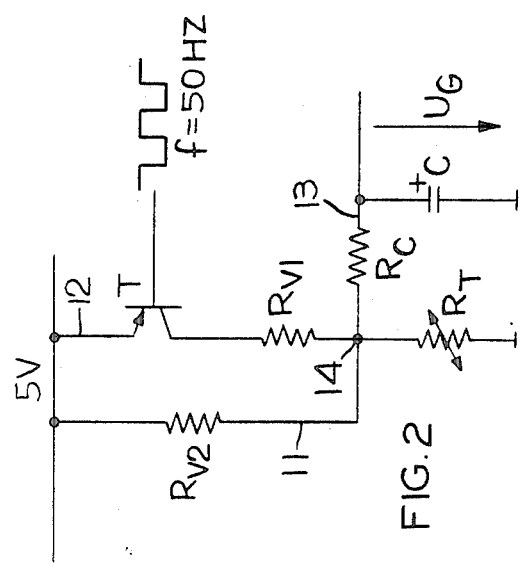
FIG. 2 shows a circuit of one embodiment of a temperature measuring device of this invention.

The temperature measuring device of this invention illustrated in FIG. 2 consists of a temperature dependent resistor $R_T$ which is subjected to a constant voltage source of 5 volts through a dropping resistor circuit having a pair of parallel branches 11, 12 which include, respectively, one high ohmic dropping resistor $R_{V2}$ and one low ohmic dropping resistor $R_{V1}$. The high ohmic resistor has, for example, a value of 4.7 KOhm, and the low ohmic $R_{V1}$ a value of 120 Ohm. The resistances of the resistors $R_{V1}$ and $R_{V2}$ have a ratio of at least 1 to 10. In circuit branch 12 of the low ohmic dropping resistor $R_{V1}$, a transistor T is used as a switch or circuit breaker. The base of the control transistor T is loaded with a probe frequency (f) of, for instance, 50 Hertz. An advantageous frequency is one having a probe ratio of 1:1.

If the low ohmic branch is interrupted, the dropping resistor resistance of the dropping resistor circuit is determined by $R_{V2}$ which is 4.7 KOhm.

In the case of a conducting low ohmic branch, the resistance value of the parallel dropping resistor circuit is determined by the equation:

$$\frac{1}{R_V} = \frac{1}{R_{V1}} + \frac{1}{R_{V2}} = \frac{1}{4.7 \text{ KOhm}} + \frac{1}{120 \text{ Ohm}}$$

and is calculated as about 117 Ohm. The resistance of the parallel dropping resistor circuit is primarily determined by the low ohmic dropping resistor $R_{V1}$, which has a resistance value of 120 Ohm.

Figure 2A:
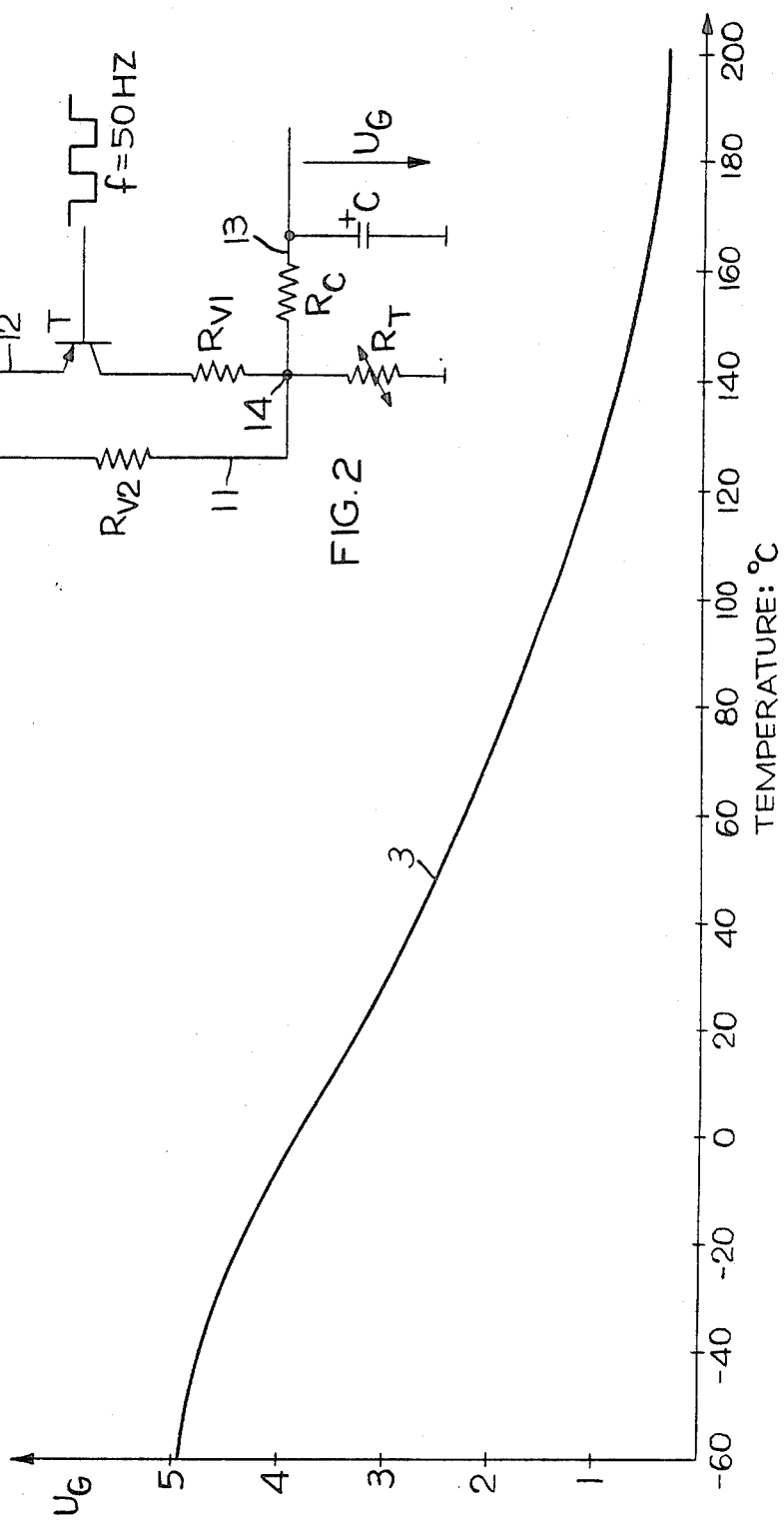
FIG. 2a is a graph showing the recorded output signal versus the temperature produced using the temperature measuring device of FIG. 2.

The dropping voltage at the temperature dependent resistor $R_T$ is plotted via a low pass filter provided by a resistor $R_C$ and a condenser C. The measuring circuit 13 connecting the resistor $R_C$ and the condenser C in series is connected at 14 with the dropping resistor parallel circuit branches 11, 12 and, thus, the circuit 13 is connected in parallel with the temperature dependent resistor $R_T$. The voltage $U_G$ across the condenser C corresponds to the output signal of the temperature measuring device of this invention as is shown in FIG. 2a plotted versus the temperature. As can clearly be seen in FIG. 2a, the output signal changes markedly at low as well as at high temperatures so that the recorded temperatures can be determined with a high degree of precision from the changes in the output signal $U_G$ throughout a temperature range from $-60°$ C. to $+200°$ C. By using a dropping resistor $R_{V1}$ which is disconnected by the switching transistor T at a set frequency, the heat buildup of the temperature dependent resistor is less than that of the prior art temperature measuring device of FIG. 1.

It is within the scope of this invention to provide a switch in the temperature measuring device whereby, in response to a control frequency, the temperature dependent resistor $R_T$ is subjected to the constant voltage source alternatively through the high ohmic resistor $R_{V2}$ or through the low ohmic resistor $R_{V1}$.

Figures 3, 3A:
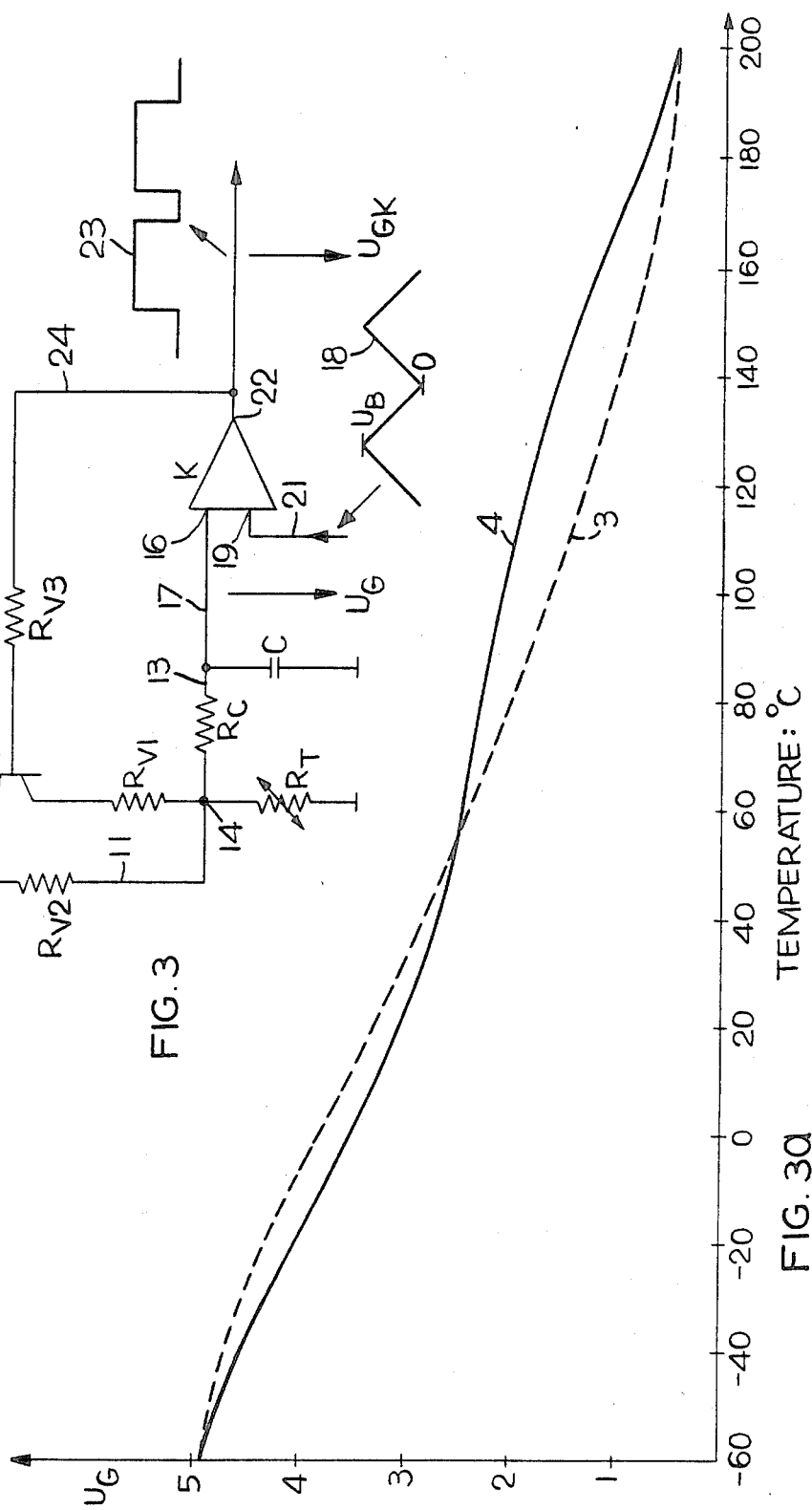
FIG. 3 shows a circuit of a second embodiment of a temperature measuring device of this invention.
FIG. 3a is a graph showing the output signal versus temperature produced by using the circuit of FIG. 3.

The temperature measuring device of FIG. 2 operates with a probe ratio of 1. Therefore, the high ohmic dropping resistor $R_{V2}$ is switched on 50% of the time, and the low ohmic dropping resistor $R_{V1}$ is switched on 50% of the time resulting in curves 1 and 2 in FIG. 1. At temperatures lower than 140° C., the voltage fluctuation of curve 2 is approximately 0; however, since the output indicated in curve 1 is switched on only 50% of the time, its voltage, and consequently any fluctuation thereof, is cut in half. The same disadvantage occurs below 0° C. for the voltage fluctuation of curve 2. By using a temperature measuring device of the embodiment shown in FIG. 3, the voltage shortage can be substantially eliminated by regulating the probe ratio, with which the two dropping resistors are switched, via the output voltage in such a way that with low output voltage, curve 1 is switched on for a long time and curve 2 for a short time and with high output voltage, curve 2 is switched on for a long time and curve 1 for a short time. Thus, as shown in FIG. 3a, the average value curve 4 at high temperatures passes above the curve 3, shown in broken lines in FIG. 3a and in a solid line in FIG. 2a, and at low temperatures the curve 4 passes below the curve 3. Thus, almost twice the gradient is attained at both ends of the measuring range of the average value curve 4 as exists in the curve 3. The increased gradient greatly increases the accuracy of measurement and recording of temperature changes at high and low temperatures.

Referring to FIG. 3, the resistors $R_1$ and $R_2$ are the dropping resistors used to produce curves 1 and 2 and the switching transistor T is the same as the one used in FIG. 2. The series connected resistor R and condenser C constitute a low pass filter by which the average value of both curves 1 and 2 is obtained. A signal from the temperature measuring circuit 13 is fed to a first input 16 of the comparer computer K via lead 17, which is connected to the measuring circuit 13 intermediate the resistor $R_C$ and the condenser C. A delta voltage wave form 18 with values fluctuating between O and $U_B$ is fed to the input 19 of the comparer computer K through a lead 21.

The comparer computer K averages the voltage drop $U_G$ received at its input 16 via lead 17, compares the average value of $U_G$ with the delta wave voltage received via input 19 and delivers at its output 22 a square wave voltage $U_{GK}$ of the form 23 which is supplied to the base of the switching transistor T via lead 24 in which a resistor $R_{V3}$ is interposed. The comparer computer K will cause the probe ratio of its output (square wave voltage $U_{GK}$) to change in response to changes in the average value of the voltage $U_G$ fed to its input 16. Thus, when measuring high temperatures, the probe ratio will be greater than 1 and the switching transistor T will be switched "on" for a longer time interval than it is "off". When measuring low temperatures, the probe ratio is less than 1 and the switching transistor is switched "on" for a shorter time than it is switched "off".

The computer can also be used to identify a break in the electrical conduction or a breakdown of temperature dependent resistor $R_T$ by analyzing the output signal, which will change erratically compared to the output signal when the components and circuits are not defective.

It may be advantageous to replace the constant source of voltage and the dropping resistors $R_{V1}$ and $R_{V2}$, which are located between NTC resistor $R_T$ and the voltage source, with two different constant voltage sources of appropriate values. The two constant sources of voltage would be alternatively connected with the NTC resistor $R_T$ in response to a control frequency.

The embodiments of the invention in which an exclusive property or privilege is claimed are defined as follows:

1. A temperature measuring device for recording large changes in temperature, including:
    a source of voltage,
    a temperature dependent resistor subjectable to changes in temperature and connected with said source of voltage via a dropping resistor circuit whereby the voltage drop at the temperature dependent resistor is a gauge for the temperature,
    means operable to change said dropping resistor circuit from a low ohmic value to a high ohmic value in the order of at least a 1 to 10 ratio in response to an electrical input of predetermined frequency and
    a temperature measuring circuit connected in parallel with said temperature sensitive resistor.

2. The temperature measuring device of claim 1 wherein said dropping resistor circuit includes parallel branches having, respectively, a high ohmic dropping resistor and a low ohmic dropping resistor, said dropping resistor circuit being connected in series with said temperature dependent resistor and further comprising a switch in said branch having said low ohmic dropping resistor which is actuated by said predetermined frequency.

3. The temperature measuring device of claim 2 wherein said switch is a transistor.

4. The temperature measuring device of claim 2 wherein said temperature dependent resistor includes a low pass filter.

5. The temperature measuring device of claim 4 wherein said frequency has a probe ratio value of 1.

6. The temperature measuring device of claim 4 wherein said switch is a transistor.

7. The temperature measuring device of claim 6 and further comprising a comparer computer with its output connected to the base of said transistor and said voltage drop at said temperature dependent resistor and a control frequency are fed into said computer.

8. The temperature measuring device of claim 7 wherein the output of said computer has a probe value synchronized with the average value of the drop in voltage across said temperature dependent resistor.

9. The temperature measuring device of claim 1 wherein the voltage drop at the temperature dependent resistor is measured by use of a measuring circuit including a low pass filter.

10. The temperature measuring device of claim 1 wherein said means includes a comparer computer.

11. The temperature measuring device of claim 10 wherein said dropping resistor circuit includes parallel branches having, respectively, a high ohmic dropping resistor and a low ohmic dropping resistor, said dropping resistor circuit being connected in series with said temperature dependent resistor and further comprising switch means operatively associated with said dropping resistor circuit and controlled by the output of said computer to alternately connect said temperature dependent resistor with high and low ohmic resistances.

12. The temperature measuring device of claim 11 wherein said switch means is a switching transistor and said output of said computer is connected to the base of said transistor.

13. The temperature measuring device of claim 12 wherein the voltage drop at the temperature dependent resistor is measured by use of a measuring circuit including a low pass filter.

14. A temperature measuring device for recording large changes in temperature, comprising:
    a source of voltage,
    a temperature dependent resistor subjectable to changes in temperature and connected with said source of voltage via a dropping resistor circuit whereby the voltage drop at the temperature dependent resistor is a gauge for the temperature, said dropping resistor circuit including parallel branches having a high ohmic dropping resistor and a low ohmic dropping resistor, respectively, said resistors having a resistance ratio of at least 10 to 1,
    a switching transistor in said branch having said low ohmic resistor,
    a measuring circuit in parallel with said temperature dependent resistor including a low pass filter,
    a comparer computer having a pair of inputs and an output,
    means connecting said measuring circuit to one of said computer inputs,
    an electrical input of predetermined frequency connected to the other input of said computer, and
    means connecting the output of said computer to the base of said switching transistor, said comparer computer providing a wave form output having a probe ratio synchronized with the voltage fed to said computer by said measuring circuit.

15. The device of claim 14 wherein the output of said computer has a square wave form.

16. The device of claim 14 wherein said measuring circuit includes an electrical resistor and condenser connected in series and wherein said one input of said computer is connected to said measuring circuit at a point between said electrical resistor and said condenser.

17. The device of claim 14 wherein said electrical input connected to said other input of said computer has a delta wave form.

18. The device of claim 14 wherein said means connecting said output of said computer to the base of said switching transistor includes a resistor.

19. The device of claim 14 wherein said comparer computer is operable to average the voltage fed to its first input and wherein said transistor is switched on for a longer time interval during high temperature measurement than during low temperature measurement, whereby a greater gradient is obtained in the high and low temperature portions of the curve produced by plotting the temperature dependent resistor voltage drop versus temperature.

* * * * *